Figure 1:
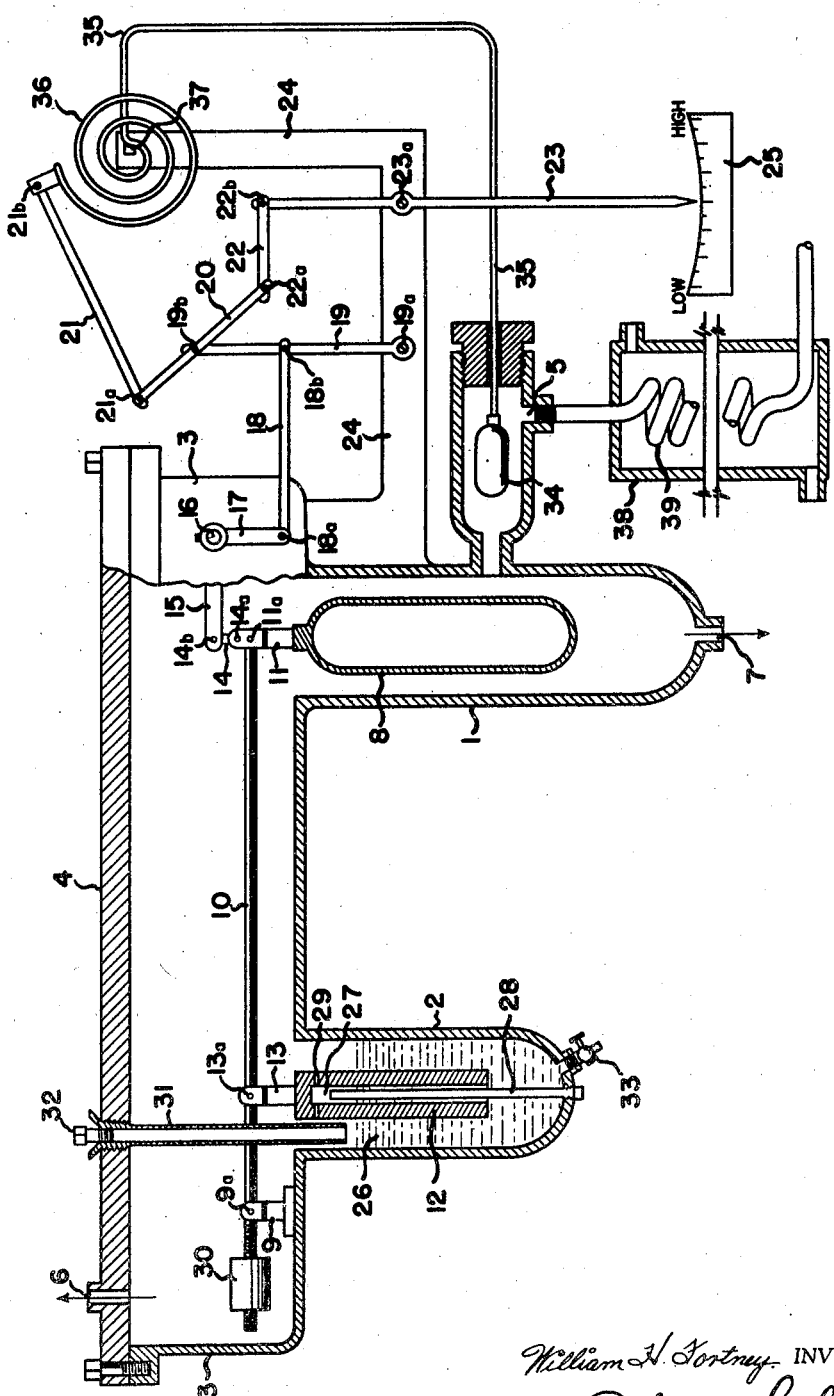

May 25, 1948.  W. H. FORTNEY  2,442,039
GRAVITY INDICATOR FOR FLUIDS
Filed Oct. 26, 1942   2 Sheets-Sheet 1

William H. Fortney INVENTOR.
BY P. J. Whelan
ATTORNEY

William H. Fortney INVENTOR.
BY P. J. Whelan
ATTORNEY.

Patented May 25, 1948

2,442,039

UNITED STATES PATENT OFFICE 2,442,039

GRAVITY INDICATOR FOR FLUIDS

William H. Fortney, Baytown, Tex., assignor to Standard Oil Development Company, a corporation of Delaware Application October 26, 1942, Serial No. 463,329

3 Claims. (Cl. 73—33)

1

The present invention relates generally to an apparatus for determining the specific gravity of a flowing fluid undergoing processing operations.

In the processing of flowing fluids, it is frequently desirable for control purposes to have a continuous record or indication of the specific gravity of the fluid as it exists in the processing equipment without withdrawing a sample. The usual method for determining specific gravity comprises withdrawing a sample from the particular process unit and then, by means of suitable hydrometers or other instruments, determining its weight in relation to an equal volume of water. In the particular instances where relatively heavy hydrocarbons are mixed with liquified normally gaseous hydrocarbons, such as propane, it is difficult to determine the specific gravity of the mixture by usual methods and it is necessary to resort to time consuming expensive operations. The periodic determination of specific gravity generally is of little or no value as far as indicating this property of the fluid undergoing processing, especially in dealing with fluids at temperatures and pressures which will materially differ from atmospheric conditions. Particularly, the usual methods of determining the specific gravity of mixtures are not suitable or applicable to mixtures that are rapidly undergoing a physical or chemical change since the withdrawn sample materially differs from the sample at the instant of its withdrawal. Likewise, the fluid in its flowing state may comprise a mixture of vapors and liquids in which case the analysis of a withdrawn sample would fail to indicate the specific gravity obtained under the conditions during the processing operations. For these and other reasons, it is highly desirable to employ an apparatus which is capable of indicating the specific gravity of the fluid under the temperature and pressure conditions encountered in the processing operation. A continuous indication of the specific gravity of a fluid under actual operating conditions serves as a valuable means for controlling particular operations.

The essence of this invention resides in an apparatus for determining the specific gravity of a fluid wherein a body of the fluid is formed, a float having a selected moment arm about a fixed fulcrum is suspended in the fluid, a second moment of force having a selected moment arm about the same fulcrum is set up in opposition to the moment of the float and the resultant of the two moments of force is observed, the ratio of the selected moment arms being varied inversely with the gravity of the fluid under observation. More specifically this invention resides in an apparatus for determining the specific gravity of a fluid wherein the change in weight of a float submerged in the fluid and attached to

2 a lever, which is movable about a fixed fulcrum, is partly counterbalanced by the change in an opposing force exerted by a second float that is at least partially submerged in a pool of mercury and is also attached to the lever in a fixed relation to the fulcrum. The difference in forces exerted by the two floats causes the lever to move, and this movement is transferred through a series of linkages and levers to an indicator which shows the specific gravity of the fluid on a calibrated scale.

One object of the present invention is to provide an apparatus for continuously determining the specific gravity of a flowing fluid under actual conditions obtaining during a processing operation.

Another object of the present invention is to provide an apparatus for continuously indicating the specific gravity of a flowing liquid which is applicable not only to normally liquid substances but also to substances which may be liquid only under superatmospheric pressures or subatmospheric temperatures.

A still further object of the present invention is to provide an apparatus which will accurately and rapidly indicate the changes in specific gravity of a flowing fluid that is undergoing definite processing operations.

Figure 2:
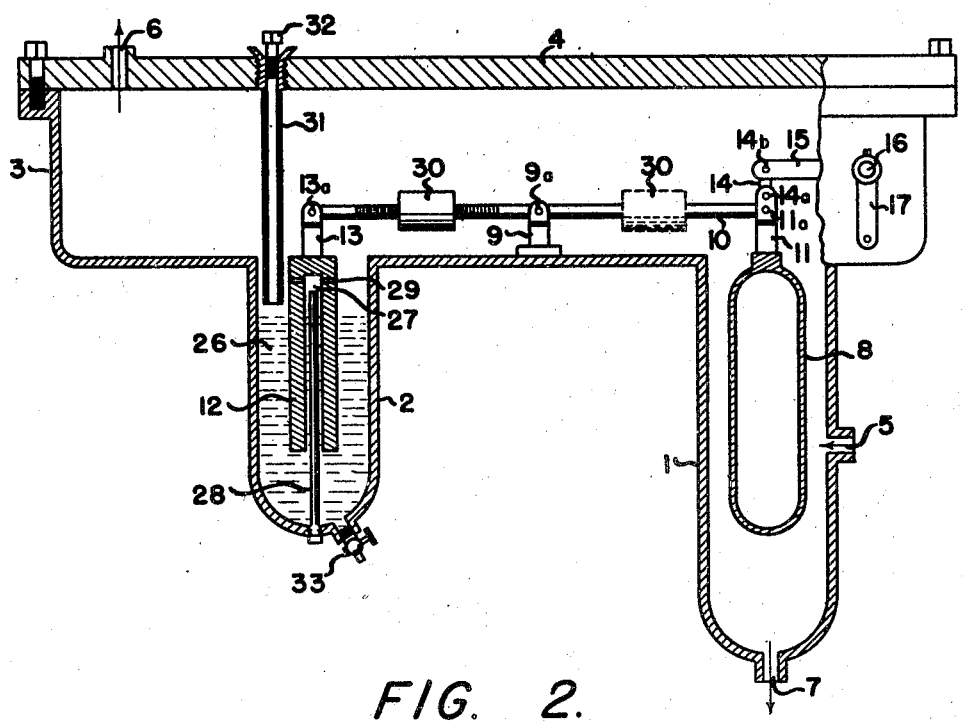
Figure 3:
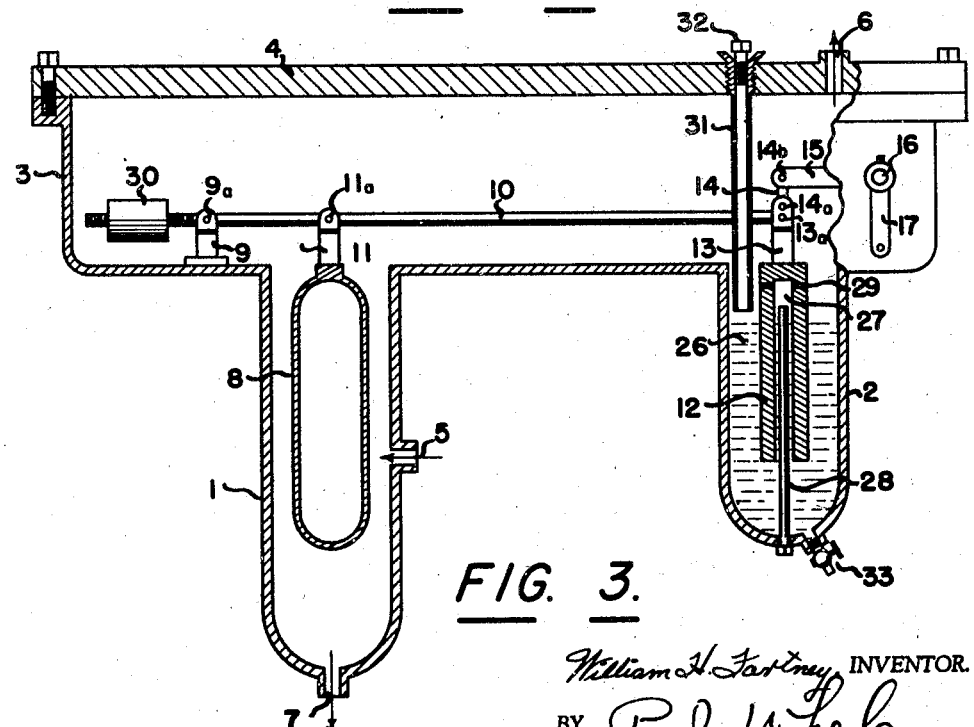

In order more clearly to describe the present invention, reference will be made to the accompanying drawings in which:

Figure 1 is an elevation, partly in cross section, of one embodiment of apparatus that is particularly adapted to indicate the specific gravity (relative to water) of a fluid in the range of approximately 0.5 to 1.0; and Figures 2 and 3 schematically illustrate the rearrangement of important elements, detailed in Figure 1, which permit convenient determination of specific gravities in the ranges below 0.5 and above 1.0, respectively.

It should be understood that the invention is not restricted to the specific embodiments shown since the drawings are merely illustrative and other modifications will occur to those skilled in the art.

Referring now to Figure 1, illustrating one embodiment of my invention, numerals 1 and 2 designate two chambers which are attached to the underside of a housing 3, provided with a gas-tight, removable cover 4. An inlet 5, for the fluid whose specific gravity is to be determined in the apparatus of the invention, is provided near the center of one side of chamber 1. Outlets 6 and 7 are arranged, respectively, at the top of housing 3 and at the bottom of chamber 1 to permit continuous withdrawal of fluid from the apparatus. Preferably these outlets are utilized simultaneously to counteract viscous drag upon float 8 located inside of chamber 1. However, when the specific gravity of fluids having low viscosities are being measured, only one or the other outlet may be employed. The rate of fluid flow is adjusted in inlet 5 and/or outlets 6 and 7 to avoid turbulence in chamber 1.

Suspended in housing 3, on a fulcrum 9, provided with a bearing 9a, is a lever 10. This lever is connected at one end through bearing 11a to linkage 11 which, in turn, is rigidly fastened to the top of float 8. At a predetermined point between bearings 9a and 11a on lever 10, a second float 12 is suspended by means of bearing 13a and link 13 which is rigidly fastened to float 12.

A short link 14 connects link 11, through bearings 14a and 14b, with a lever 15 which, at the end opposite from bearing 14b, is securely fastened to rotatable shaft 16. Shaft 16 is installed longitudinally in a plane at right angles to the plane of the aforementioned links and levers. One end of shaft 16 rotates in a bearing (not shown) which is firmly anchored to one side of housing 3; the other end of shaft 16 extends through a pressure-tight stuffing gland in the opposite side of housing 3. A lever 17 is securely fastened to shaft 16 outside of housing 3, and may be used to operate the indicating pointer of the apparatus in any manner which will occur to one skilled in the art.

One particularly desirable assembly of linkages and levers which is known in the art and which is particularly adapted to use with this invention will be described below. Lever 17 is connected through bearing 18a to link 18 which, in turn, actuates lever 19 through bearing 18b. Lever 19 is mounted at one end on bearing 19a and is connected at the other end with lever 20 through bearing 19b. A link 21 connects one end of lever 20, through bearing 21a with temperature compensating apparatus which will be subsequently described. A second link 22 connects the other end of lever 20, through bearings 22a and 22b, with indicator 23. This indicator arm is pivoted on bearing 23a which, together with bearing 19a, is securely mounted on support 24 at a predetermined distance from housing 3. An indicating scale 25 is mounted adjacent to the end of the indicator arm.

The material of construction, the structure, and the size of float 8 will depend upon the specific gravity and chemical nature of the fluid to be tested. Likewise, since the fluid under test completely fills the housing 3, and partially surrounds float 12, the material for construction of float 12 and the various levers, linkages, and bearings within housing 3 will be suitably chosen to withstand corrosion by the fluid.

For measurement of the specific gravity of hydrocarbons and similar fluids which do not readily corrode metals, float 8 may conveniently be an air-filled, liquid-tight cylinder made of sheet brass, steel, or other suitable material. Float 12 may conveniently be a cylindrical rod of steel or stainless steel which withstands amalgamation with mercury 26 in which it is partially submerged to the desired level. To keep float 12 in a substantially upright position, it is provided with a guide hole 27 and a guide rod 28 which fits loosely within the guide hole and is securely fastened in a vertical position at the bottom of chamber 2. Guide hole 27 and rod 28 are of such lengths that their upper ends will always be above the level of mercury 26. To avoid trapping a compression pocket of fluid in the upper part of guide hole 27, small vent holes 29 are provided in the upper part of float 12.

In case the fluid under test is heavy, it is necessary only to fill chamber 1 with it. With lighter fluids which may in part be gaseous, it is preferable to maintain the whole free space of the apparatus filled. In case the fluid is corrosive to mercury it is advantageous to cover the mercury with a layer of inert liquid, which in a given case may be glycerine.

The range of specific gravities which can be measured by the apparatus of this invention can be varied within a narrow range by adjusting the position of a counterweight 30 on lever 10 and by adjusting the level of mercury 26. Filler tube 31, with plug 32, is provided to permit convenient addition of mercury to chamber 2; similarly, valve 33 is provided in the bottom of the chamber for withdrawal of mercury therefrom.

It will be understood that all the bearings on the various levers and linkages in the apparatus should be constructed as frictionless as possible to avoid sluggishness of the instrument; likewise, these bearings should be free from "play" since this contributes to inaccurate measurements. It will be further understood by those skilled in the art that the relative lengths of the levers and linkages and the relative sizes of the floats shown in the drawings may be varied to suit particular conditions without coming outside the scope of the present invention.

Since the specific gravity indicated by the instrument is subject to variations in temperature of the fluid under measurement, provision is made for a temperature compensating device which may be connected, as previously mentioned, through linkage 21. This temperature compensating device is actuated by a fluid, contained in bulb 34 which may be located in inlet 5 or elsewhere in the fluid under examination, having a high coefficient of thermal expansion, such as alcohol, mercury, etc. Bulb 34 is connected by means of capillary tube 35 with the central end of spiral tube 36 where the latter is firmly mounted by mounting post 37 on bracket 24 or other stationary support. The outer end of spiral expansion tube 36 is sealed to prevent leakage of hydraulic fluid and is free to move link 21 to which it is connected through bearing 21b.

The relation between specific gravity and temperature is exponential so that care must be taken not to use the arrangement shown over a large range of temperatures because this arrangement is based on a straight line relationship. The relationship over small ranges is substantially straight line, so it is desirable to provide a temperature control bath 38 ahead of entrance 5 in which is a coil 39 to conduct the fluid so as to keep the variation in temperature of the fluid within a narrow range. Where it is possible to attain sufficiently exact temperature control with the bath 38, the temperature compensator may be dispensed with.

Referring now to Figures 2 and 3, modifications of the apparatus of this invention for measuring specific gravities in the ranges below about 0.5 and above about 1.0, respectively, are shown. Since the numerals designating the various parts correspond with those already described with respect to Figure 1, they require very little further description. It has been found that, if the placement of the floats 8 and 12 with respect to fulcrum 9 were other than as shown in Figures 1, 2 and 3 for the stated approximate specific gravity ranges, the lengths of the levers and/or the sizes of the floats would be unadapted to a practical size instrument. In general, it will be found that floats 8 and 12 are preferably placed at distances from fulcrum 9 such that the resulting moment arms are approximately inversely proportional to the specific gravities of the fluid in chamber 1 and the fluid 26 in chamber 2, respectively.

For a clearer understanding of the present invention, the following mathematical derivation of the apparatus described in Figure 1 is presented. In the particular embodiment, float 12 had an outside diameter of 2.14 inches and an inside diameter of 0.75 inch, thereby having an effective diameter (the diameter of a solid cylinder of the same area) of 2 inches and an actual cross sectional area of 3.1416 square inches or 0.021817 square foot, an overall length of 16 inches, a volume of 0.029088 cubic foot, and a weight of 14.0495 pounds. The mercury chamber 2 had an overall inside diameter of 3.068 inches and a cross sectional area of 0.05134 square foot. The guide post 28 had a diameter of 0.25 inch or a cross sectional area of 0.000343 square foot. Hence the effective area of the mercury chamber 2 was 0.050997 square foot as determined by subtracting the area of the guide post from the overall area of the chamber.

The dimensions of the float 8 were selected so that it had a diameter of 3 inches, a length of 14.5 inches, a volume of 0.05931 cubic foot and a weight of 4.375 pounds.

The distance between bearings $9a$ and $13a$ was 3.451 inches, between bearings $13a$ and $11a$ was 9.250 inches, and between bearings $9a$ and $11a$ was 12.701 inches.

The metals used in the apparatus were steel and mercury weighing 483 and 845 pounds per cubic foot, respectively.

The following calculations are based on an instrument for measurement of the specific gravities, at 60° F., of oils in the range from 0.60 to 0.70. Oils of these specific gravities weigh 37.39 and 43.62 pounds per cubic foot, respectively. In the calculations the above-mentioned weights and dimensions, together with the following symbols, were used:

$V_m$ = volume of float 12 actually immersed in mercury in chamber 2
$V_o$ = volume of float 12 actually immersed in oil in chamber 2
$V_f$ = volume of float 8
$d_1$ = effective diameter of float 12, expressed in feet
$d_2$ = effective diameter of chamber 2, expressed in feet
$I_1$ = immersion, expressed in feet, of float 12 in mercury at a specific gravity reading of 0.7
$I_2$ = immersion, expressed in feet, of float 12 in mercury at a specific gravity reading of 0.6
$T_m$ = rise of mercury level, expressed in feet, as float 12 is moved downward by a decrease in specific gravity (of the fluid being measured) from 0.7 to 0.6
$T_f$ = downward travel of float 12, expressed in feet, as the specific gravity reading decreases from 0.7 to 0.6

$I_1 \times \frac{\pi}{4} d_1^2 = V_m$ = volume of float 12 actually immersed in mercury when specific gravity of oil in chamber 1 is 0.7

$I_2 \times \frac{\pi}{4} d_1^2 = V_m$ = volume of float 12 actually immersed in mercury when specific gravity of oil in chamber 1 is 0.6

Now assuming that an oil having a specific gravity of 0.6 was passing through the apparatus, then the clockwise moments about bearing $9a$ are:

$$3.451 \times 14.0495 = 48.4848$$
$$12.701 \times 4.375 = 55.5669$$
$$\overline{\phantom{xxxx}104.0517}$$

and the counterclockwise moments are:

$$3.451 \times V_m \times 845 = V_m \times 2916$$
$$3.451 \times V_o \times 37.39 = V_o \times 129.03$$
$$12.701 \times V_f \times 37.39 = V_f \times 474.89$$
$$V_o = \text{total volume} - V_m$$
$$= 0.029088 - V_m$$

so $$V_o \times 129.03 = 129.03 (0.029088 - V_m)$$
$$= 3.7532 - 129.03 V_m$$

and $$V_f \times 474.89 = 0.05931 \times 474.89 = 28.1657$$

Summing the moments $$(V_m \times 2916) + (3.7532 - 129.03 V_m) + (28.1657)$$

The clockwise moments must balance the counterclockwise moments, such that $$(V_m \times 2916) + (3.7532 - 129.03 V_m)$$
$$+ (28.1657) = 104.0517$$

$$2786.97 V_m = 72.1328$$

$$V_m = \frac{72.1328}{2786.97} = 0.02588$$

Thus, with an oil of 0.60 gravity, the mercury float has 0.02588 cubic foot immersed in the mercury.

Assuming next that an oil having a specific gravity of 0.7 was passing through the apparatus, then the clockwise moments about bearing $9a$ are:

$$3.451 \times 14.0495 = 48.4848$$
$$12.701 \times 4.375 = 55.5669$$
$$\overline{\phantom{xxxx}104.0517}$$

and the counterclockwise moments are:

$$3.451 \times V_m \times 845 = V_m \times 2916$$
$$3.451 \times V_o \times 43.62 = V_o \times 150.53$$
$$12.701 \times V_f \times 43.62 = V_f \times 554.02$$
$$V_o = 0.029088 - V_m$$

so $$V_o \times 150.53 = 150.53 (0.029088 - V_m)$$
$$= 4.3786 - 150.53 V_m$$

and $$V_f \times 554.02 = 0.05931 \times 554.02 = 32.8589$$

Summing moments $$(V_m \times 2916) + (4.3786 - 150.53 V_m) + (32.8589)$$

The clockwise moments must equal the counterclockwise moments, such that $$(V_m \times 2916) + (4.3786 - 150.53 V_m)$$
$$+ (32.8589) = 104.0517$$

$$2765.47 V_m = 66.8142$$

$$V_m = \frac{66.8142}{2765.47} = 0.02416$$

Thus, with an oil of 0.7 gravity, the mercury float has 0.02416 cubic foot immersed in the mercury.

Deriving the relation between the specific gravity change and travel of float 12, the following calculations are obtained:

$$T_m = T_f \times \frac{d_1^2}{d_2^2 - d_1^2} \quad (1)$$

The relation between the volume of float 12 in the mercury 26 and rise of mercury 26 when specific gravity changes from 0.7 to 0.6 is shown by the expression:

$$I_2 \times \tfrac{\pi}{4} d_1^2 - I_1 \times \tfrac{\pi}{4} d_1^2 - T_m \times \tfrac{\pi}{4} d_1^2 = T_f \times \tfrac{\pi}{4} d_1^2 \quad (2)$$

Substituting Equation 1 in Equation 2

$$I_2 \times \tfrac{\pi}{4} d_1^2 - I_1 \times \tfrac{\pi}{4} d_1^2 - T_f \tfrac{d_1^2}{d_2^2 - d_1^2} \times \tfrac{\pi}{4} d_1^2 = T_f \times \tfrac{\pi}{4} d_1^2 \quad (3)$$

And transposing $$I_2 \times \tfrac{\pi}{4} d_1^2 - I_1 \times \tfrac{\pi}{4} d_1^2 = T_f \times \tfrac{\pi}{4} d_1^2 + T_f \tfrac{d_1^2}{d_2^2 - d_1^2} \times \tfrac{\pi}{4} d_1^2 \quad (4)$$

And simplifying $$I_2 \times \tfrac{\pi}{4} d_1^2 - I_1 \times \tfrac{\pi}{4} d_1^2 = T_f \times \tfrac{\pi}{4} d_1^2 \left(1 + \tfrac{d_1^2}{d_2^2 - d_1^2}\right) \quad (5)$$

Solving for $T_f$ $$T_f = \frac{I_2 \times \tfrac{\pi}{4} d_1^2 - I_1 \times \tfrac{\pi}{4} d_1^2}{\tfrac{\pi}{4} d_1^2 \left(1 + \tfrac{d_1^2}{d_2^2 - d_1^2}\right)} \quad (6)$$

The change in volume of float 12 submerged in mercury 26 is given by the difference between $V_m$ at specific gravity 0.7 and $V_m$ at specific gravity 0.6, and is related to the travel of float 12 in the following manner:

$V_m$ at specific gravity 0.6=

$$I_2 \times \tfrac{\pi}{4} d_1^2 = 0.02588 \text{ cu. ft.} \quad (7)$$

And $V_m$ at specific gravity 0.7=

$$I_1 \times \tfrac{\pi}{4} d_1^2 = 0.02416 \text{ cu. ft.} \quad (8)$$

Subtracting Equation 8 from Equation 7= 0.00172 cu. ft. which is the change in immersion of float 12 in mercury as the specific gravity decreases from 0.7 to 0.6.

The effective horizontal cross sectional area of float 12 is:

$$\tfrac{\pi}{4} d_1^2 = 0.021817 \text{ sq. ft.}$$

and the value of the expression is:

$$\frac{d_1^2}{d_2^2 - d_1^2} = 0.7477$$

Substituting the above values in Equation 6:

$$T_f = \frac{0.00172}{0.021817 (1 + 0.7477)} = 0.0451 \text{ ft. or } 0.541 \text{ inch}$$

Thus the mercury float travels 0.541 inch and the oil float travels $$\frac{12.701}{3.451} \times 0.541 = 1.991 \text{ inches}$$

From the foregoing calculations, it is evident that, when the specific gravity of the fluid changes from 0.6 to 0.7, float 8 travels in a vertical direction 1.991 inches. This motion is transmitted through link 14, lever 15, shaft 16, lever 17, link 18, levers 19, and 20, and link 22 to indicator arm 23. It will be understood that the vertical motion of float 8 can be made to increase or decrease the travel of indicator 23 on scale or chart 25 depending upon the relative lengths of the above-mentioned levers.

Although adjustments of counterweight 30 allows varying the reading on the indicator chart to the extent of about 0.1 specific gravity unit, the primary purpose of counterweight 30 is to offset the weight of the several levers and linkages connecting the various parts of the instrument. Hence, although counterweight 30 has been shown in specific positions in Figures 1, 2, and 3, it will be understood that this counterweight may be positioned at any point on lever arm 10, or an extension thereof, to effect horizontal balance of this lever and attached linkages. For example, another position which the weight may assume is shown in dotted lines in Fig. 2. Counterweight 30 thus eliminates from the mathematical development set forth above all factors except the relative buoyancy of floats 8 and 12, and allows the design to be calculated to exact calibration.

Although the apparatus has been described with relation to its use in determining and indicating the specific gravity of a mixture of light and heavy hydrocarbons, it is to be clearly understood that I am not to be limited to any particular application to which the apparatus may be employed; for example, besides indicating the specific gravity of a flowing fluid, this type of apparatus lends itself to controlling different processing operations in which the specific gravity changes are a critical feature. For example, the apparatus may be employed to control the quality of a light hydrocarbon stream from a fractionating tower; or it may be employed to indicate and control the specific gravity of oil-solvent solutions in a solvent extraction system. When the apparatus is used for control purposes, it will be understood that the indicating arm 23 will be connected in a suitable manner well known in the art to a control element, such as a flow valve, a heating unit, a refluxing unit or any other element to the control of which one or more of the variables of the process involved responds. The arm 23 may itself be a control arm or may have a control arm linked to it in an operative fashion so that it may serve simultaneously to indicate specific gravity and to control one or more of the variables of the process with which the liquid in chamber 1 is associated.

Throughout the specification reference has been made to the term "specific gravity." Wherever this term has been used is meant the relative density of a substance as compared with some standard substance, that is, the ratio of the mass of a certain volume to the mass of an equal volume of a standard at some reference temperature.

In the foregoing description it will be apparent to those skilled in the art that many variations of the described apparatus may be made without departing from the spirit and scope of the present invention.

Having now described my invention, what I wish to claim as new and novel and secure by Letters Patent is:

1. An apparatus for measuring the specific gravity of a flowing liquid comprising a closed chamber, a pair of spaced receptacles depending from said chamber and in open fluid communication therewith, a lever arm mounted on a fulcrum in said chamber and overlying said receptacles, said lever being mounted for free rotation around said fulcrum but otherwise fixed relative thereto, a pair of floats suspended by pivoted rigid members from said lever arm into said receptacles, there being one float in each receptacle, means for introducing the flowing liquid into one of said receptacles, an outlet for said liquid provided in said chamber at a point such that the chamber is maintained full of said liquid, a liquid, immiscible with said flowing liquid, in the other of said receptacles in an amount to partially immerse the float in said receptacle and of a nature such as to cause said float to exert a force on said lever in opposition to the force exerted by the float in the first receptacle and means for indicating the motion of said lever arm in response to the resultant of said forces.

2. An apparatus according to claim 1 in which means independent of said lever arm are provided for causing said indicating means to respond also to changes in temperature in said flowing fluid.

3. An apparatus for measuring the specific gravity of a flowing liquid comprising a closed chamber, an inlet for said liquid into said chamber, an outlet for said liquid, provided in said chamber at a point such that the chamber is maintained full of said liquid, a first float in said chamber disposed in said liquid, a body of liquid, immiscible with said flowing liquid, in said chamber, a second float disposed in said body of liquid, a lever system mounted on a fulcrum within the chamber, said lever system being mounted for rotation around said fulcrum but otherwise fixed thereto, rigid members pivotly connecting said first and second floats to said lever system at respective distances from said fulcrum such that the resulting moment arms are approximately inversely proportional to the specific gravities of said flowing liquid and said immiscible liquid, respectively, for applying the forces exerted by the respective floats to said lever system in opposition to each other, and means for indicating the resulting movement of the lever system.

WILLIAM H. FORTNEY.

REFERENCES CITED

The following references are of record in the file of this patent:

UNITED STATES PATENTS

| Number | Name | Date |
|---|---|---|
| 569,177 | Custodis | Oct. 13, 1896 |
| 1,368,524 | Parkhurst et al. | Feb. 15, 1921 |
| 1,424,403 | Hartman et al. | Aug. 1, 1922 |
| 1,604,387 | Caldwell | Oct. 26, 1926 |
| 1,770,559 | Taylor | July 15, 1930 |
| 1,800,532 | Howard | Apr. 14, 1931 |
| 1,862,402 | Hubbell | June 7, 1932 |
| 2,023,164 | Cady | Dec. 3, 1935 |
| 2,279,254 | Irwin | Apr. 7, 1942 |

FOREIGN PATENTS

| Number | Country | Date |
|---|---|---|
| 27,928 | Germany | July 21, 1884 |
| 66,271 | Germany | Dec. 20, 1892 |
| 76,487 | Germany | Aug. 3, 1894 |
| 184,789 | Great Britain | Apr. 12, 1923 |
| 446,069 | Great Britain | Apr. 23, 1936 |